(12) United States Patent
Yoshioka et al.

(10) Patent No.: US 12,110,415 B2
(45) Date of Patent: *Oct. 8, 2024

(54) SURFACE PROTECTION COMPOSITION AND TERMINAL FITTED ELECTRIC WIRE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); KYUSHU UNIVERSITY, NATIONAL UNIVERSITY CORPORATION, Fukuoka (JP)

(72) Inventors: Naho Yoshioka, Yokkaichi (JP); Yutaka Takata, Yokkaichi (JP); Naoyuki Oshiumi, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, NATIONAL UNIVERSITY CORPORATION, Fukuoka (JP)

(*) Notice: Subject to any disclaimer, the term of this patent is extended or adjusted under 35 U.S.C. 154(b) by 214 days.

This patent is subject to a terminal disclaimer.

(21) Appl. No.: 17/784,785

(22) PCT Filed: Nov. 25, 2020

(86) PCT No.: PCT/JP2020/043873
§ 371 (c)(1),
(2) Date: Jun. 13, 2022

(87) PCT Pub. No.: WO2021/117487
PCT Pub. Date: Jun. 17, 2021

(65) Prior Publication Data
US 2022/0372306 A1    Nov. 24, 2022

(30) Foreign Application Priority Data

Dec. 13, 2019 (JP) .................. 2019-225372

(51) Int. Cl.
*H01R 4/20* (2006.01)
*C09D 5/08* (2006.01)
(Continued)

(52) U.S. Cl.
CPC ............... *C09D 5/086* (2013.01); *C09D 7/61* (2018.01); *C09D 7/63* (2018.01); *C09D 133/10* (2013.01);
(Continued)

(58) Field of Classification Search
CPC ... H01B 3/44; H01B 7/02; H01B 7/04; H01B 7/06; H01B 7/2806; H01R 4/20;
(Continued)

(56) References Cited

U.S. PATENT DOCUMENTS 11,390,759 B2* 7/2022 Oshiumi .................. C23C 26/00
11,898,059 B2* 2/2024 Oshiumi .............. H01B 7/2806
(Continued)

FOREIGN PATENT DOCUMENTS

CN  101687954 A * 3/2010 ............ C08F 220/10
CN  108884345 A    11/2018
(Continued)

OTHER PUBLICATIONS

Jan. 26, 2021 International Search Report issued in International Patent Application No. PCT/JP2020/043873.
(Continued)

*Primary Examiner* — William H. Mayo, III
(74) *Attorney, Agent, or Firm* — Oliff PLC

(57) ABSTRACT

A surface protection composition contains (a) a phosphorus compound represented by formula (1),
(Continued)

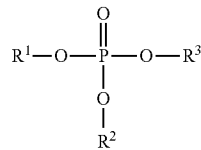

(1)

wherein R¹ represents a hydrogen atom, R² represents a hydrocarbon group having 4 to 30 carbon atoms, and R³ represents a hydrogen atom or a hydrocarbon group having 4 to 30 carbon atoms, (b-1) a metal-containing compound or (b-2) an amine compound, (c) a (meth)acrylate having a hydrocarbon chain having 4 or more carbon atoms, (d-1) an acylphosphine oxide photopolymerization initiator and (d-2) an α-aminoacetophenone photopolymerization initiator, wherein the composition has the compound (d-1) in an amount of 0.1 to 3.0 mass % with respect to the total amount of the composition, compound (d-2) in an amount of 0.1 to 3.0 mass % with respect to the total amount of the composition and a total amount of the compound (d-I) and (d-2) is less than 5.0 mass % with respect to the total amount of the composition.

13 Claims, 2 Drawing Sheets

(51) Int. Cl.
| | | |
|---|---|---|
| C09D 7/61 | (2018.01) | |
| C09D 7/63 | (2018.01) | |
| C09D 133/10 | (2006.01) | |
| C09D 135/02 | (2006.01) | |
| C10M 101/02 | (2006.01) | |
| C10M 107/28 | (2006.01) | |
| C10M 111/04 | (2006.01) | |
| C10M 125/10 | (2006.01) | |
| C10M 133/06 | (2006.01) | |
| C10M 137/04 | (2006.01) | |
| C10M 141/10 | (2006.01) | |
| H01B 1/22 | (2006.01) | |

(52) U.S. Cl.
CPC .......... *C09D 135/02* (2013.01); *C10M 101/02* (2013.01); *C10M 107/28* (2013.01); *C10M 111/04* (2013.01); *C10M 125/10* (2013.01); *C10M 133/06* (2013.01); *C10M 137/04* (2013.01); *C10M 141/10* (2013.01); *H01B 1/22* (2013.01); *C10M 2201/062* (2013.01); *C10M 2203/1025* (2013.01); *C10M 2209/0845* (2013.01); *C10M 2209/0863* (2013.01); *C10M 2215/26* (2013.01); *C10M 2223/04* (2013.01)

(58) Field of Classification Search
CPC .......... H01R 4/62; C09D 5/08; C09D 201/00; C08F 220/10; C08F 290/06
USPC ..................... 174/74 R, 78, 84 R, 88 R, 84 C
See application file for complete search history.

(56) References Cited

U.S. PATENT DOCUMENTS

| | | | |
|---|---|---|---|
| 2005/0186442 A1* | 8/2005 | Gros ................... | C23C 28/3225 |
| | | | 428/626 |
| 2009/0186163 A1 | 7/2009 | Umebayashi et al. | |
| 2010/0256027 A1 | 10/2010 | Miyamoto et al. | |
| 2016/0326410 A1 | 11/2016 | Yamaguchi et al. | |
| 2017/0117650 A1* | 4/2017 | Yoshida ................ | H01R 4/185 |
| 2017/0243673 A1 | 8/2017 | Nakashima et al. | |
| 2018/0163058 A1* | 6/2018 | Nakashima .......... | C09D 201/00 |
| 2018/0179400 A1* | 6/2018 | Nakashima .......... | C10M 137/06 |
| 2018/0219235 A1 | 8/2018 | Soga et al. | |
| 2019/0071581 A1 | 3/2019 | Yoshikawa et al. | |
| 2019/0173213 A1* | 6/2019 | Takata ................ | C23F 11/1673 |
| 2020/0392350 A1 | 12/2020 | Oshiumi et al. | |

FOREIGN PATENT DOCUMENTS

| | | |
|---|---|---|
| JP | H06-033272 A | 2/1994 |
| JP | 2003-530442 A | 10/2003 |
| JP | 2009-173712 A | 8/2009 |
| JP | 2015-181322 A | 10/2015 |
| JP | 2019-157209 A | 9/2019 |
| JP | 2020-164669 A | 10/2020 |
| JP | 2021-001364 A | 1/2021 |
| WO | 2007/052522 A1 | 5/2007 |
| WO | 2016/067891 A1 | 5/2016 |
| WO | 2017/018546 A1 | 2/2017 |
| WO | 2019176515 A1 | 9/2019 |

OTHER PUBLICATIONS

Sep. 16, 2022 Office Action issued in Chinese Patent Application No. 202080085182.0.

* cited by examiner

SURFACE PROTECTION COMPOSITION AND TERMINAL FITTED ELECTRIC WIRE

TECHNICAL FIELD

The present disclosure relates to a surface protection composition and a terminal fitted electric wire, and more specifically, to a surface protection composition excellent in anticorrosion property for preventing metal corrosion, and a terminal fitted electric wire excellent in anticorrosion property treated with the composition.

BACKGROUND ART

For metal equipment and metal parts, a grease is used for the purpose of lubrication and corrosion resistance. For example, Patent Literature 1 describes the use of a grease containing a perfluoroether base oil, a consistency improver, and barium sulfate or antimony oxide to machinery parts. Patent Literature 2 describes the use of a composition containing a lubricating base oil and a gelling agent to protect the metal surface.

CITATION LIST

Patent Literature

Patent Literature 1: WO 2007/052522 A
Patent Literature 2: JP H06-33272 A
Patent Literature 3: WO 2017/018546 A

SUMMARY OF APPLICATION

Problems to Be Solved By the Application

The compositions described in Patent Literatures 1 and 2 exhibit inferior adsorption force to the metal surface and inferior anticorrosion performance to prevent the metal corrosion when the compositions are applied to the metal surface since the compositions do not contain metal adsorbing components.

Further, when the composition being applied has low viscosity, the composition applied to the metal surface may become a thin film. Thin film compositions are susceptible to oxygen inhabitation when cured by radial reaction, so that the oxygen inhibition may result in insufficient curing. Moreover, if components are precipitated from the composition during storage, and so forth, the function of the components precipitated will be reduced.

It is an object of the present disclosure to provide a surface protection composition that has excellent anticorrosion performance to prevent metal corrosion, and has also excellent curability when made into the form of the thin films, and may reduce precipitation of components, and a terminal-fitted electric wire treated with the composition.

Means of Solving the Problems

A surface protection composition according to the present disclosure contains (a) a phosphorus compound represented by the following general formula (1), (b-1) a metal-containing compound or (b-2) an amine compound, (c) a (meth) acrylate having a hydrocarbon chain having 4 or more carbon atoms, (d-1) an acylphosphine oxide photopolymerization initiator and (d-2) an α-aminoacetophenone photopolymerization initiator. Further, the surface protection composition has the compound (b-1) in an amount of 0.1 to 3.0 mass % with respect to the total amount of the composition, the compound (d-2) in an amount of 0.1 to 3.0 mass % with respect to the total amount of the composition and a total amount of the compound (d-1) and (d-2) is less than 5.0 mass % with respect to the total amount of the composition.

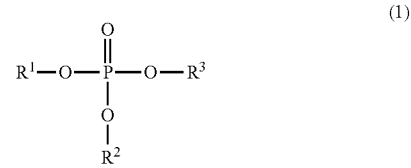

In the above-presented general formula, $R^1$ represents a hydrogen atom, $R^2$ represents a hydrocarbon group having 4 to 30 carbon atoms, and $R^3$ represents a hydrogen atom or a hydrocarbon group having 4 to 30 carbon atoms.

In the terminal fitted electric wire according to the present disclosure, an electric connection part between a terminal and an electric wire conductor is covered with a cured product of a surface protection composition according to the present disclosure.

ADVANTAGEOUS EFFECTS OF INVENTION

A surface protection composition according to the present disclosure has excellent anticorrosion performance to prevent metal corrosion, and has also excellent curability performance when made into the form of thin films, and further may reduce precipitation of components.

DESCRIPTION OF EMBODIMENTS

Figure 1:
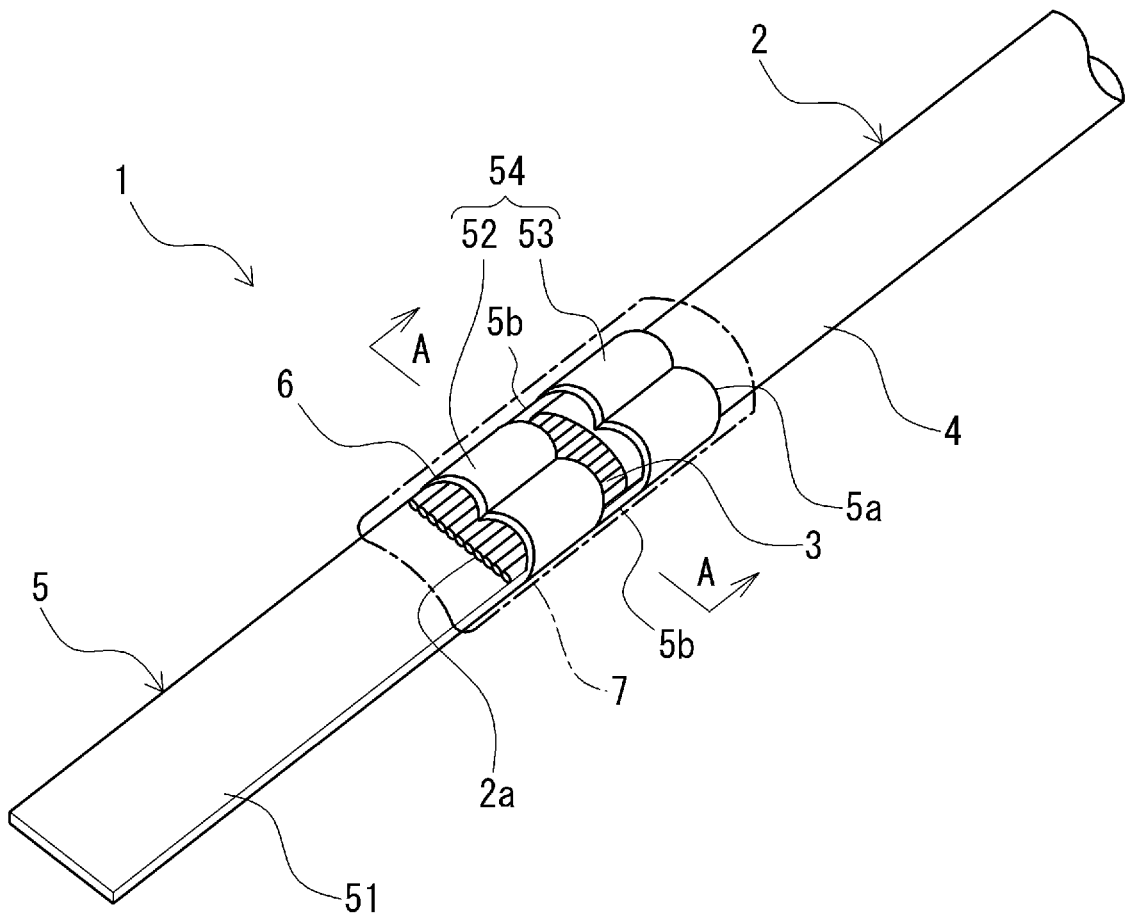
FIG. 1 is a perspective view of a terminal fitted electric wire according to an embodiment.

Explanation of Embodiments According to Present Disclosure

Firstly, embodiments according to the present disclosure are described and explained.

(1) A surface protection composition according to the present disclosure contains (a) a phosphorus compound presented by the following general formula (1), (b-1) a metal-containing compound or (b-2) an amine compound, (c) a (meth)acrylate having a hydrocarbon chain having 4 or more carbon atoms, (d-1) an acylphosphine oxide photopolymerization initiator and (d-2) an α-aminoacetophenone photopolymerization initiator. Further, the surface protection composition has the compound (d-1) in an amount of 0.1 to 3.0 mass % with respect to the total amount of the composition, the compound (d-2) in an amount of 0.1 to 3.0 mass % with respect to the total amount of the composition and a total amount of the compounds (d-1) and (d-2) is less than 5.0 mass % with respect to the total amount of the composition.

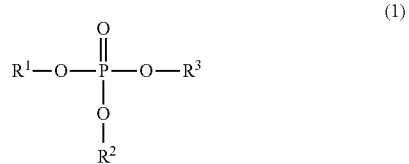

In the above-presented general formula, $R^1$ represents a hydrogen atom, $R^2$ represents a hydrocarbon group having 4 to 30 carbon atoms, and $R^3$ represents a hydrogen atom or a hydrocarbon group having 4 to 30 carbon atoms.

The surface protection composition according to the present disclosure contains (a) a phosphorus compound represented by the above general formula (1), (b-1) a metal-containing compound or (b-2) an amine compound, (c) a (meth)acrylate having a hydrocarbon chain having 4 or more carbon atoms, (d-1) an acylphosphine oxide photopolymerization initiator and (d-2) an α-aminoacetophenone photopolymerization initiator. Further, the surface protection composition has the compound (b-1) in an amount of 0.1 to 3.0 mass % with respect to the total amount of the composition, the compound (d-2) in an amount of 0.1 to 3.0 mass % with respect to the total amount of the composition and a total amount of the compound (d-1) and (d-2) is less than 5.0 mass % with respect to the total amount of the composition. The surface protection composition having described above components can have excellent anticorrosion performance to prevent metal corrosion and have also excellent curability performance when made int the form of thin films, and further may reduce the precipitation of the components.

(2) It is preferable that the surface protection composition contains the compound (a) in an amount of 0.1 to 10 mass % in terms of phosphorus element with respect to the total amount of the composition. With this arrangement, the surface protection composition shows excellent absorption force to the metal surface and a cured product of the composition shows an excellent heat resistance performance since a gel with a high melting point is formed in curing due to containment of the compound (c) being relatively large enough. Further, it is preferable that the surface protection composition contains the amount of the compound (b-1) in an amount of 0.1 to 10 mass % in terms of a metal element with respect to the total amount of the composition, or contains the compound (b-2) in an amount of 0.1 to 5.0 mass % in terms of a nitrogen element with respect to the total amount of the composition. With this arrangement, the surface protection composition shows excellent absorption force to the metal surface and can prevent to decrease the effect of the surface protection due to excess of the compounds (b-1) or compound (b-2). Moreover, it is preferable that the surface protection composition contains the compound (c) in an amount of 1.0 to 70 mass % with total amount of the composition. With this arrangement, the surface protection composition shows an excellent heat resistance performance since a gel with high melting point is formed in curing, and the surface protection composition shows excellent adsorption force to the metal surface due to containment of the compound (a) being relatively large enough.

(3) It is preferable that the compound (c) contains two or more carbon-carbon double bounds. With this arrangement, the compound (c) becomes a polymer consisting of a three-dimensional structure through photopolymerization and the surface protection composition becomes harder to melt at a high temperature.

(4) It is preferable that the metal in the compound (b-1) is one selected from the group of alkali metals, alkaline earth metals, aluminum, titanium, and zinc. With this arrangement, the phosphorus compound (a) can be strongly absorbed on a coated metal surface.

(5) It is preferable that at least one of the hydrocarbon groups having 4 to 30 carbon atoms in the compound (a) has one or more branched structures or one or more carbon-carbon double bonds. With this arrangement, orientation between hydrocarbon groups in the compound (a) is suppressed, the crystallinity of the compound (a) decreases, and hence compatibility with the compound (c) improves.

(6) It is preferable that the surface protection composition further contain (e) a lubricating base oil in an amount of 10 to 90 mass % with respect to the total amount of the composition. With this arrangement, the coating properties of the surface protection composition at room temperature improve.

(7) In a terminal fitted electric wire according to the present disclosure, an electric connection part between the terminal fitting and the electric conductor is covered with a cured product of the surface protection composition according to the present disclosure. The terminal fitted electric wire according to the present disclosure shows excellent anticorrosion performance to prevent metal corrosion since the electric connection part between the terminal fitting and the electric conductor is covered with the surface protection composition according to the present disclosure.

Details of Embodiments According to Present Disclosure

Concrete examples of a surface protection composition according to the present disclosure are explained hereunder in reference to the drawings. However, the present disclosure is not limited to those examples.

The surface protection composition according to the present disclosure (hereinafter, it may be referred to as the present protection composition) contains (a) a phosphorous compound represented by the following general formula (1), (b-1) a metal-containing compound or (b-2) an amine compound, (c) a meth (acrylate) having a hydrocarbon chain having 4 or more carbon atoms, (d-1) an acylphosphine oxide photopolymerization initiator and (d-2) α-aminoacetophenone photopolymerization initiator. Further, the surface protection composition contains the compound (d-1) in an amount of 0.1 to 3.0 mass % with respect to the total amount of the composition and the compound (d-2) in an amount of 0.1 to 3.0 mass % with respect to the total amount of the composition, and a total amount of the compounds (d-1) and (d-2) is less than 5. 0 mass % with respect to the total amount of the composition. The present protection composition may further contain (e) a lubricating base oil.

The compound (a) is phosphorous compound represented by the following general formula (1). The phosphorus compound represented by the following general formula (1) has a low-polarity portion (i.e., lipophilic portion) composed of hydrocarbon groups and a high-polarity portion containing a phosphorus group.

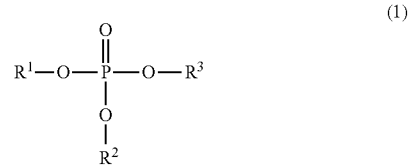

In the above general formula (1), $R^1$ represents hydrogen atom, $R^2$ represents hydrocarbon groups having 4 to 30 carbon atoms, $R^3$ represents hydrogen atom or hydrocarbon group having 4 to 30 carbon atoms.

The compound (a) contains the hydrocarbon group having 4 to 30 carbon atoms, to thereby show an excellent compatibility with the compound (c) having a hydro carbon chain having 4 or more carbon atoms and improve compatibility with (e) the lubricating base oil if the present protection composition contains (e) the lubricating base oil. If the number of carbons in the hydrocarbon group is less than 4, the compound (a) tends to crystallize easily and the compatibility of the compound (a) with the compound (c) or (e) would decrease. On the other hand, if the number of carbon atoms in the hydrocarbon group is more than 30, the viscosity of the compound (a) tends to become too high, so that the coating property of the surface protection composition would decrease even if the compounds (c) or (e) are added. From a viewpoint of the compatibility with the compounds (c) or (e), the hydrocarbon groups described above more preferably has 5 or more carbon atoms, and much more preferably has 6 or more carbon atoms. Moreover, from a viewpoint of the coating properties of the present protection composition, hydrocarbon groups described above preferably has more preferably 26 or less carbon atoms, and much more preferably 22 or less carbon atoms.

In the above general formula (1), $R^3$ may or may not be the same hydrocarbon groups as $R^2$. $R^3$ is preferably a hydrogen atom or the same hydrocarbon group as $R^2$.

Examples of the hydrocarbon groups in the above general formula (1) include an alkyl group, a cycloalkyl group, an alkyl-substituted cycloalkyl group, an alkenyl group, an aryl group, an alkyl-substituted aryl group, and an arylalkyl group. Among these, an alkyl group, a cycloalkyl group, an alkyl-substituted cycloalkyl group and an alkenyl group, which are aliphatic hydrocarbon groups or alicyclic hydrocarbon groups, are preferable. When each hydrocarbon groups of the compound (a) is an aliphatic hydrocarbon group or an alicyclic hydrocarbon group, the compatibility of the compound (a) with the lubricating base oil (e) improves when the present protection composition contains the lubricating base oil (e).

The alkyl group may be linear or branched. Examples of the alkyl group include butyl group, isobutyl group, tert-butyl group, pentyl group, hexyl group, heptyl group, octyl group, 2-ethylhexyl group, nonyl group, decyl group, undecyl group, dodecyl group, tridecyl group, tetradecyl group, pentadecyl group, hexadecyl group, heptadecyl group, octadecyl group (i.e., stearyl group), isostearyl group, butyloctyl group, myristyl group, isomyristyl group, isocetyl group, hexyldecyl group, octyldecyl group, octyldodecyl group, behenyl group, and isobehenyl group.

Examples of the cycloalkyl group include cyclopentyl group, cyclohexyl group, and cycloheptyl group. Examples of the alkyl-substituted cycloalkyl group include a methylcyclopentyl group, a dimethylcyclopentyl group, a methylethylcyclopentyl group, a diethylcyclopentyl group, a methylcyclohexyl group, a dimethylcyclohexyl group, a methylethylcyclohexyl group, a diethylcyclohexyl group, a methylcycloheptyl group, and a dimethylcycloheptyl group, a methylethylcycloheptyl group, and a diethylcycloheptyl group. The substitution position of the alkyl-substituted cycloalkyl group is not particularly limited.

The alkenyl group may be linear or branched. Examples of the alkenyl group include butenyl group, pentenyl group, hexenyl group, heptenyl group, octenyl group, nonenyl group, decenyl group, undecenyl group, dodecenyl group, tridecenyl group, tetradecenyl group, pentadecenyl group, hexadecenyl group, heptadecenyl group, octadecenyl group, and oleyl group.

Examples of the aryl group include phenyl group and naphthyl group. Examples of the alkyl-substituted aryl group include a tolyl group, a xylyl group, an ethylphenyl group, a propylphenyl group, a butylphenyl group, a pentylphenyl group, a hexylphenyl group, a heptylphenyl group, an octylphenyl group, a nonylphenyl group, a decylphenyl group, an undecylphenyl group, and a dodecylphenyl group. The substitution position of the alkyl-substituted aryl group is not particularly limited. The alkyl group of the alkyl-substituted aryl group may be linear or branched. Examples of the arylalkyl group include benzyl group, phenylethyl group, phenylpropyl group, phenylbutyl group, phenylpentyl group, and phenylhexyl group. The alkyl group of the arylalkyl group may be linear or branched.

In the compound (a), at least one of the hydrocarbon groups having 4 to 30 carbon atoms is preferably a hydrocarbon group having 8 to 30 carbon atoms. Further, in the compound (a), at least one of the hydrocarbon groups having 4 to 30 carbon atoms preferably has one or more branched chains or one or more carbon-carbon double bonds. When a hydrocarbon group in the compound (a) has branched chains or carbon-carbon double bonds, the orientation of the hydrocarbon groups of the compound (a) is suppressed, crystallinity of the compound (a) is reduced. This results in improvement of the compatibility of the compound (c) having hydrocarbon chain with the compound (a). Further, the compatibility of the compound (a) with the lubricating base oil (e) is improved if the present protection composition contains the lubricating base oil (e).

Specific examples of the phosphorus compound represented by the above general formula (1) include butyloctyl acid phosphate, isomyristyl acid phosphate, isocetyl acid phosphate, hexyldecyl acid phosphate, isostearyl acid phosphate, isobehenyl acid phosphate, octyldecyl acid phosphate, octyldodecyl acid phosphate, isobutyl acid phosphate, 2-ethylhexyl acid phosphate, isodecyl acid phosphate, lauryl acid phosphate, tridecyl acid phosphate, stearyl acid phosphate, oleyl acid phosphate, myristyl acid phosphate, palmityl acid phosphate, dibutyl octyl acid phosphate, diisomyristyl acid phosphate, diisocetyl acid phosphate, dihexyl decyl acid phosphate , diisostearyl acid phosphate, diisobehenyl acid phosphate, dioctyldecyl acid phosphate, dioctyldodecyl acid phosphate, diisobutyl acid phosphate, di-2-ethylhexyl acid phosphate, diisodecyl acid phosphate, ditridecyl acid phosphate, dioleyl acid phosphate, dimyristyl acid phosphate, and dipalmityl acid phosphate.

The surface protection composition preferably contains the compound (a) in an amount of 0.1 to 10 mass % in terms of phosphorus element with respect to the total amount of the composition. When the composition contains the compound (a) in an amount of 0.1 mass % or larger in terms of the phosphorous element with respect to the total amount of the composition, the present protection composition shows excellent absorption force to the metal surface, and shows excellent performance to prevent the metal surface corrosion. When the composition contains the compound (a) in an amount of 10 mass % or smaller in terms of the phosphorous element with respect to the total amount of the composition, the amount of the compound (c) contained in the composition is accordingly enough to form a gel with a high melting point during curing, so that the present protection composition shows an excellent heat resistance property. Further, from a viewpoint of the absorption force to the metal surface, the composition more preferably contains the compound (a) in an amount of 0.5 mass % or larger in terms of phosphorous element with respect to the total amount of the composition, much more preferably contains in an amount of 1.0 mass % or larger. Moreover, from a viewpoint of the heat resistance performance, the composition more preferably contains the compound (a) in an amount of 8.0 mass % or smaller, and much more preferably contains 5.0 mass % or smaller in terms of a phosphorous element with respect to the total amount of the composition.

The compound (b-1) is a metal-containing compound. The compound (b-2) is an amine compound. In the preset protection composition, only one of compounds (b-1) and (b-2) may be contained, or both compounds (b-1) and (b-2) maybe contained. On the metal surface coated with the present protection composition, the compounds (b-1) and (b-2) promote ionization of metal on the metal surface and thus the phosphorus compound (a) can be absorbed onto the metal surface. Thus, the present protection composition can be absorbed on the metal surface.

Examples of the metal-containing compounds include a metal hydroxide and a metal oxide. Examples of the metal of the metal-containing compound include alkali metals such as Li, Na, and K, alkaline earth metals such as Mg and Ca, aluminum, titanium, and zinc. The compound (b-1) may consist of only one of the metal-containing compounds consisting of any one of these metals, or two or more of these metal-containing compounds. These metals have relatively high ionization tendency. Thus, ionization of the metal atoms at the metal surface is promoted by the metal atom's containment in the present protection composition and the phosphorus compound (a) can be strongly absorbed on the metal surface.

The metal in the metal-containing compound preferably has a valance of two or higher like alkaline earth metals, aluminum, titanium, and zinc from a viewpoint of hydrophilicity.

From a viewpoint of water-resisting property, Ca and Mg are more preferable.

The present protection composition preferably contains the compound (b-1) in an amount of 0.1 to 10 mass % in terms of metal element with respect to the total amount of the composition. When the present protection composition contains the compound (b-1) in an amount of 0.1 mass % or larger in terms of metal element, the adsorption force of the phosphorus compound (a) onto the metal surface becomes stronger through formation of an ionic bond and the present protection composition have excellent anticorrosion performance to prevent the corrosion of the metal surface. Moreover, when the present protection composition contains the compound (b-1) in an amount of 10 mass % or smaller in terms of metal element with respect to the total amount of the composition, the reduction of the surface protection effect due to the effect of excess of metal-containing compounds is suppressed. Furthermore, from a viewpoint of the absorption force of the phosphorus compound (a), the present protection composition more preferably contains the compound (b-1) in an amount of 0.5 mass % or larger, much more preferably in an amount of 1.0 mass % or larger. Meanwhile, the present protection composition more preferably contains the compound (b-1) in an amount of 8.0 mass % or smaller in terms of metal element with respect to the total amount of the composition, much more preferably in an amount of 5.0 mass % or smaller.

Examples of the amine compound includes an organic amine compound having a hydrocarbon group with 2 to 100 carbon atoms, and more preferably an organic amine compound having a hydrocarbon group with 2 to 22 carbon atoms. From a viewpoint of oxidation stability, the organic amine compound still more preferably has a hydrocarbon group having 8 or more carbon atoms. The amine compounds maybe any of primary, secondary, and tertiary organic amine compounds.

More specifical examples of the amine compound include octylamine, laurylamine, myristylamine, stearylamine, behenylamine, oleylamine, tallow alkylamine, cured tallow alkylamine, aniline, benzylamine, cyclohexylamine, diethylamine, dipropylamine, dibutylamine, diphenylamine, dibenzylamine, dicyclohexylamine, triethylamine, tributylamine, dimethyloctylamine, dimethyldecylamine, dimethylstearylamine, dimethyl tallow alkylamine, dimethyl-cured tallow alkylamine, and dimethyloleylamine. These may be used alone as the compound (b-2), or two or more of them may be used in combination. Octylamine and stearylamine are preferred among these.

The present protection composition preferably contains the compound (b-2) in an amount of 0.1 to 5.0 mass % in terms of nitrogen element with respect to the total amount of the composition. When the present protection composition contains the compound (b-2) in an amount of 0.1 mass % or larger in terms of nitrogen element with respect to the total amount of the composition, the adsorption force of the phosphorus compound (a) onto the metal surface becomes stronger through formation of an ionic bond and the present protection composition have excellent anticorrosion performance to prevent the corrosion of the metal surface. Meanwhile, when the present protection composition contains the compound (b-2) in an amount of 5 mass % or smaller in terms of nitrogen element with respect to the total amount of the composition, the reduction of the surface protection effect due to the effect of excess of amine compounds is suppressed. Furthermore, from a viewpoint of the absorption force of the phosphorus compound (a), the present protection composition more preferably contains the compound (b-2) in an amount of 0.3 mass % or larger, and much more preferably in an amount of 0.5 mass % or larger in terms of nitrogen element with respect to the total amount of the composition. Meanwhile, the present protection composition more preferably contains the compound (b-2) in an amount of 3.0 mass % or smaller, and much more preferably in an amount of 2.0 mass % or smaller in terms of nitrogen element with respect to the total amount of the composition.

The compound (c) is a specific (meth)acrylate having the hydrocarbon chain having 4 or more carbon atoms. Many (meth)acrylates are liquid at room temperature. Since the compound (c) has the hydrocarbon chain having 4 or more carbon atoms, the compound (c) has excellent compatibility with the compound (a) having the hydrocarbon group having 4 or more carbon atoms. As a result, the present protection composition is easy to be applied uniformly even at room temperature and has excellent coating performance.

In the compound (c), a hydrocarbon chain with 4 or more carbon atoms may be any of linear, branched, or cyclic. Further, one or more carbon-carbon double bonds maybe contained. The hydrocarbon chain with 4 or more carbon atoms is preferably a hydrocarbon chain with 8 or more carbon atoms. Further, the hydrocarbon chain with 4 or more carbon atoms is a hydrocarbon chain preferably with 30 or less carbon atoms and yet preferably with 22 or less carbon atoms. Examples of the hydrocarbon chain having 4 or more carbon atoms include an alkyl chain, a cycloalkyl chain, an alkyl-substituted cycloalkyl chain, an alkenyl chain, an aryl chain, an alkyl-substituted aryl chain, and an arylalkyl chain. Among these, an alkyl chain, a cycloalkyl chain, an alkyl-substituted cycloalkyl chain, and an alkenyl chain, which are aliphatic hydrocarbon chains and alicyclic hydrocarbon chains, are preferable.

The compound (c) may be a (meth) acrylate having two or more carbon-carbon double bonds and a hydrocarbon chain having 4 or more carbon atoms, or may be a (meth) acrylate having a carbon-carbon double bonds and having a hydrocarbon chain having 4 or more carbon atoms. Furthermore, the both a (meth)acrylate having two or more carbon-carbon double bonds and a hydrocarbon chain having 4 or more carbon atoms and a (meth)acrylate having a carbon-carbon double bonds and having a hydrocarbon chain having 4 or more carbon atoms are used in combination. When the compound (c) has two or more carbon-carbon double bonds, it becomes a polymer of a three-dimensional structure through photopolymerization and becomes harder to melt at a high temperature. The compound (a) is excellent in solubility with the compound (c), and thus it will be held in a polymer of the compound (c). As a result, the cured product of the present protection composition is difficult to melt and has excellent heat resistance performance since the compound (a) becomes hard to flow out under a high temperature. Here, high temperature means a temperature of 155° C.

Carbon-carbon double bonds in the compound (c) may be carbon-carbon double bond in a (meth)acryloyl group and in an alkenyl group. The (meth)acrylate having two or more carbon-carbon double bonds may be a monofunctional (meth)acrylate having an alkenyl group. Alternatively, regardless of whether or not the (meth)acrylate has an alkenyl group, the (meth)acrylate may be a bifunctional or higher functional (meth)acrylate. The (meth)acrylate includes either one or both of an acrylate and a methacrylate.

Examples of the (meth)acrylate (c) include monofunctional (meth)acrylates such as dicyclopentenyl (meth)acrylate and dicyclopentenyloxyethyl (meth)acrylate and polyfunctional (meth)acrylates such as butanediol di(meth) acrylate, hexanediol di(meth)acrylate, nonanediol di(meth) acrylate, decanediol di(meth)acrylate, 2-butyl-2-ethyl-1,3-propanediol di(meth)acrylate, tricyclodecanedimethanol di(meth)acrylate, neopentyl glycol di(meth)acrylate, di(meth)acrylate of EO modified bisphenol A, di(meth)acrylate of EO or PO modified hydrogenated bisphenol A, bis[4-(2-acryloyloxyethoxy)phenyl]fluorene, trimethylolpropane tri (meth)acrylate, and pentaerythritol tri(meth)acrylate. These may be used alone as the compound (c) or may be used in combination of two or more.

It is preferable that the present protection composition contains the compound (c) in an amount of 1.0 to 70 mass % with respect to the total amount of the composition. When the amount of the compound (c) is 1.0 mass % or larger with respect to the total amount of the composition, the compound (c) is highly effective in preventing the cured product of the preset protection composition from melting at a high temperature. Meanwhile, when the amount of the compound (c) is 70 mass % or smaller with respect to the total amount of the composition, the amount of the compound (a) contained in the composition is accordingly enough to form the surface protection composition with stronger adsorption force to the metal surface and higher effect to prevent metal corrosion. From a viewpoint of preventing the compound from melting at high temperature, the compound (c) is more preferably in amount of 5.0 mass % or larger, and much more preferably 10 mass % or larger with respect to the total amount of the composition. Furthermore, from a viewpoint of the adsorption force to the metal surface, the compound (c) is more preferably in an amount of 50 mass % or smaller, and even more preferably 30 mass % or smaller with respect to the total amount of the composition.

When the amount of the compound (c) is described in relation to the amount of the compounds (a), (b-1), and (b-2), it is preferable that the mass ratio ((a)+(b-1)+(b-2)) : (c) of the total of the compounds (a), (b-1), and (b-2) to the compound (c) is within the range of 98:2 to 10:90. When the amount of the compound (c) with respect to the total of the compounds (a), (b-1), (b-2) and (c) is 2.0 mass % or larger, or when the amount of compounds ((a)+(b-1)+(b-2)) with respect to the total of the compounds (a), (b-1), (b-2), and (c) is in an amount of 98 mass % or smaller, an excellent effect is provided to prevent the cured product of the present protection composition from melting at a high temperature. From this viewpoint, the amount of the compound (c) with respect to the total of the compounds (a), (b-1), (b-2), and (c) is more preferably 5.0 mass % or larger, much more preferably 10 mass % or larger, and even more preferably 20 mass % or larger. On the other hand, when the amount of the compound (c) with respect to the total of the compounds (a), (b-1), (b-2) and (c) is 70 mass % or smaller, or when the total amount of the compounds ((a) +(b-1)+(b-2)) with respect to the amount of the compounds (a), (b-1), (b-2), and (c) is 30 mass % or larger, the surface protection composition exhibits its strong adsorption force and an excellent effect is provided to prevent the corrosion at the metal surface. From this viewpoint, the amount of the compound (c) with respect to the total of the compounds (a), (b-1), (b-2), and (c) is more preferably 60 mass % or smaller, and even more preferably 50 mass % or smaller.

The compound (d-1) is an acylphosphine oxide photopolymerization initiator. There is no specific limitation on the compound (d-1) if it is an acylphosphine oxide photopolymerization initiator. Examples of the compound (d-1) include 2,4,6-Trimethylbenzoyldiphenylphosphineoxide, and bis-(2,6-dimethoxybenzoyl)-2,4,4-trimethylpentylphosphineoxide. A single type of acylphosphine oxide photopolymerization initiator may be used alone or two or more acylphosphine oxide photopolymerization initiator may be used in combination as the compound (d-1). Example of commercially available product of the acylphosphine oxide photopolymerization initiators include Omnirad TPO series, the Ominirad 819 series (trade name of IGM Resins B.V.).

The acylphosphine oxide photopolymerization initiators have excitation wavelengths between 360 nm and 410 nm. This means that the excitation wavelength rises around at 360 nm and converges around at 410 nm with a broad range. Thus, a light source with a central wavelength between 365 nm and 395 nm should be used for light irradiation. Examples of such light source include LED lamps.

The present protection composition preferably contains the compound (d-1) in an amount of 0.1 to 3.0 mass % with respect to the total amount of the composition. When the amount of the compound (c) is 0.1 mass % or larger with respect to the total amount of the composition, curing will be sufficient when the present protection composition is irradiated with light, and an effect of preventing the corrosion at the metal surface is enhanced. Meanwhile, when the amount of the compound (d-1) is 3.0 mass % or smaller with respect to the total amount of the composition, the cured product becomes uniform, so that the present protection composition has high effect of preventing corrosion of the metal surface. Moreover, from a viewpoint of excellent curability performance of the cured product, the amount of the compound (d-1) is more preferably 0.5 mass % or larger, and even more preferably 1.0 mass % or larger with respect to the total amount of the composition. On the other hand, from a viewpoint of excellence in uniformity of the cured products, the present protection composition preferably contains the compound (d-1) in an amount of 2.5 mass % or smaller, and much more preferably 2.0 mass % or smaller with respect to the total amount of the composition.

The compound (d-2) is an α-aminoacetophenone photopolymerization initiator. There is no specific limitation of the compound (d-2) if it is an α-aminoacetophenone photopolymerization initiator. Examples of the compound (d-2) include 2-Methyl-1-[4-(methylthio)phenyl]-2-morpholino-propanone-1, 2-benzyl-2-dimethylamino-1-(4-morpholinophenyl)-butan-1-one, 2-(dimethylamino)-2-[(4-methylphenyl)methyl]-1-[4-(4-morpholinyl)phenyl]-1-butanone, and N,N-dimethylaminoacetophpenone. A single type of α-aminoacetophenone photopolymerization initiator maybe used alone or two or more types of α-aminoacetophenone photopolymerization initiator may be used in combination as the compound (d-2). Examples of the commercially available product of the α-aminoacetophenone photopolymerization initiator include Omnirad907 Omnirad369, and Omnirad379 manufactured by IGM Resins B.V.

The α-aminoacetophenone photopolymerization initiator has an amino group. By utilizing the property of the amino group to bond with oxygen, oxygen inhibition is suppressed when the present protection composition is formed into a thin film and cured, and thus the present protection composition shows an excellent thin film curability. Tertiary amino groups are particularly good as amino groups. In addition to the amino group, the α-aminoacetophenone photopolymerization initiator also has a structure as a photopolymerization initiator. As a result, the present protection composition has an excellent thin-film curability.

The present protection composition preferably contains the compound (d-2) in an amount of 0.1 mass % to 3.0 mass % with respect to the total amount of the composition. When the amount of the compound (d-2) is 0.1 mass % or larger, the present protection composition has high effect of thin-film curability. Meanwhile, when the amount of the compound (d-2) is 3.0 mass % or smaller with respect to the total amount of the composition, the cured product becomes uniform and has high effect of preventing corrosion of the metal surface. Moreover, from a viewpoint of the excellent thin-film curability, the present protection composition more preferably contains the compound (d-2) in an amount of 0.5 mass % larger, and even more preferably in an amount of 1.0 mass % or larger with respect to the total amount of the composition. Moreover, from a viewpoint of the excellent uniformity of the cured product, the amount of the compound (d-2) is more preferably 2.5 mass % or smaller, and even more preferably 2.0 mass % or smaller with respect to the total amount of the composition.

The total amount of the compounds (d-1) and (d-2) is preferably smaller than 5.0 mass % with respect to the total amount of the composition. When the total amount of the compounds (d-1) and (d-2) is smaller than 5.0 mass o, precipitation of the compound (d-1) or (d-2) may be suppressed at the time of storing of the present protection composition for example and lowering of the commercial value or malfunction of the present protection composition will be prevented. Furthermore, from a viewpoint of suppressing the precipitation of the compounds (d-1) and (d-2), the total amount of the compounds (d-1) and (d-2) is more preferably 4.5 mass % or smaller, and even more preferably 4.0 mass % or smaller with respect to the total amount of the composition.

The compound (e) is a lubricating base oil. When the present protection composition contains the compound (e), coating properties of the present protection composition can be improved at room temperature. The present protection composition preferably contains the compound (e) in an amount of 10 to 90 mass %, and more preferably in an amount of 30 to 70 mass % with respect to the total amount of the composition.

The lubricating base oil used herein includes any one of a mineral oil, a wax isomerized oil, and a synthetic oil, which are usually used as base oils of lubricating base oils. They may be used alone or two or more of them may be used in combination. Specific examples of the mineral oil include paraffinic and naphthenic oils, and n-paraffin, which are purified from lubricating base oil fractions obtained by distillation under ordinary pressure or distillation under reduced pressure of crude oils by appropriately combining purification treatments such as solvent deasphalting, solvent extraction, hydrocracking, solvent dewaxing, catalytic dewaxing, hydrorefining, sulfuric acid cleaning, and white clay treatment of a lubricating base oil fractions.

The isomerized oils used herein include those prepared through a hydrogen isomerization treatment of a wax raw material, such as natural wax, e.g., petroleum slack wax obtained through solvent dewaxing of a hydrocarbon oil, or a synthetic wax formed through the so-called Fischer Tropsch synthetic process, in which a mixture of carbon monoxide and hydrogen is brought in contact with a suitable synthetic catalyst at a high temperature and a high pressure. In the case of using the slack wax as the wax raw material, since the slack wax contains large amounts of sulfur and nitrogen, which are unnecessary in the lubricating base oil, it is desirable that the slack wax is hydrogenated as needed to prepare a wax raw material reduced in the sulfur content and the nitrogen content.

Although not particularly limited, examples of the synthetic oil include a poly-α-olefin, such as 1-octene oligomer, 1-decene oligomer, and ethylene-propylene oligomer and a hydrogenated product thereof, isobutene oligomer and hydrogenated products thereof, isoparaffin, alkylbenzene, alkylnaphthalene, diester (for example, ditridecyl glutarate, di-2-ethylhexyl adipate, diisodecyl adipate, ditridecyl adipate, and di-2-ethylhexyl sebacate), polyol ester (for example, trimethylolpropanecaprylate, trimethylolpropanepelargonate, pentaerythritol-2-ethylhexanoate, and pentaerythritol pelargonate), polyoxyalkylene glycol, dialkyl diphenyl ether, and polyphenyl ether.

Although the kinematic viscosity of the lubricating base oil is not particularly limited, usually the kinematic viscosity is preferably in the range of 1 to 150 mm$^2$/s at 100° C. The kinematic viscosity at 100° C. is more preferably within a range of 2 to 130 mm$^2$/s because the volatility and the handleability in production are excellent. The kinematic viscosity is measured according to JIS K 2283.

To the present protection composition, an addictive such as a stabilizer, a corrosion inhibitor, a dye, a viscosity improver, and a filler can be added as long as the function of the present protection composition is not deteriorated.

The present protection composition may be prepared by mixing of the compounds (a), (b-1) or (b-2), (c), (d-1), and (d-2) all together, or may be prepared by addition of the compounds (c), (d-1), and (d-2) to a mixture of the compounds (a) and (b-1) or (b-2). When the present protection composition contains the compound (e) and/or additives, the present protection composition may be prepared by mixing of the compounds (a), (b-1) or (b-2), (c), (d-1), (d-2) and (e) and the additives all together, or may be prepared by addition of the compounds (c), (d-1), (d-2), and (e) and the additives to a mixture of the compounds (a) and (b-1) or (b-2).

The surface of a material to be coated can be coated with the present protection composition by application of the present protection composition onto the surface of the material or immersion of the material into the present protection composition. Examples of the material to be coated include metal materials. Examples of the metal species of the metal materials include Cu, Cu alloys, Al, Al alloys, metal materials having various plated layers on these materials, which are preferably used for terminal fittings, wire conductors, etc. The present protection composition can be cured by irradiation of light such as ultraviolet after coating of the surface of the metal to be coated. Thus, the surface of the metal to be coated is covered with the cured product of the present protection composition. The film thickness of the cured product of the present protection composition is not particularly restricted and may be adjusted to about 0.5 to 100 μm.

As described above, the present protection composition contains the phosphorus compound (a), and the metal-containing compound (b-1) or the amine compound (b-2). Thus, the present composition can be adsorbed on the covering metal surface. Further, the present protection composition contains the (meth)acrylate (c) and the photopolymerization initiator (d-1), and thus the composition can be cured by radical reaction. Since the photopolymerization initiator of the compound (d-1) is an acylphosphine oxide photopolymerization initiator and the surface protection composition contains an α-aminoacetophenonephotopolymerization initiator as the compound (d-2) along with the compound (d-1), the present protection composition shows excellent curability performance when made into the form of thin films. As a result, the present protection composition has excellent anticorrosion performance to prevent metal corrosion and excellent curability performance when made into the form of thin films. Furthermore, the total amount of the compounds (d-1) and (d-2) are suppressed within the specific range, and thus the precipitation of the compound (d-1) or (d-2) may be suppressed to thereby prevent lowering of the commercial value or malfunction of the present protection composition.

The present protection composition contains the (meth) acrylate as the compound (c) and further may contain the lubricating base oil (e). As a result, the present protection composition can be liquid with low viscosity at room temperature, and thus can be formed into a thin film by coating with the present protection composition at room temperature. Herein, a thin film is a film having a thickness of several to 10 μm. A Thin film formed from radical-curable compositions are susceptible to oxygen inhibition, so that the thin film can be easily insufficient curability. As a result, the thin film reduces anticorrosion performance to prevent the metal corrosion. On the other hand, the present protection composition can have excellent curability when the thin film is formed, thus the present composition protection can maintain excellent anticorrosion performance to prevent the corrosion of the metal surface when formed into a thin film. Furthermore, the present protection composition can be stably cured into the form of a thin film on the surface of an object having a complicated structure since the present protection composition has excellent curability performance.

The present protection composition can be used for anticorrosion. For example, the present protection composition can be used to cover a surface of a metal part to be protected with closely contacting the surface, thereby preventing corrosion of the metal part. For example, a terminal-fitted electric wire may be covered with the present protection composition for preventing corrosion.

Next, a terminal-fitted electric wire of the present disclosure is to be described.

A terminal-fitted electric wire of the present disclosure contains an insulated wire and a terminal connected to an end of the conductor of the insulated wire. An electric connection part between the terminal and the conductor is covered with a cured product of the surface protection composition. Hence, the electric connection part is prevented from corroding.

Figure 2:
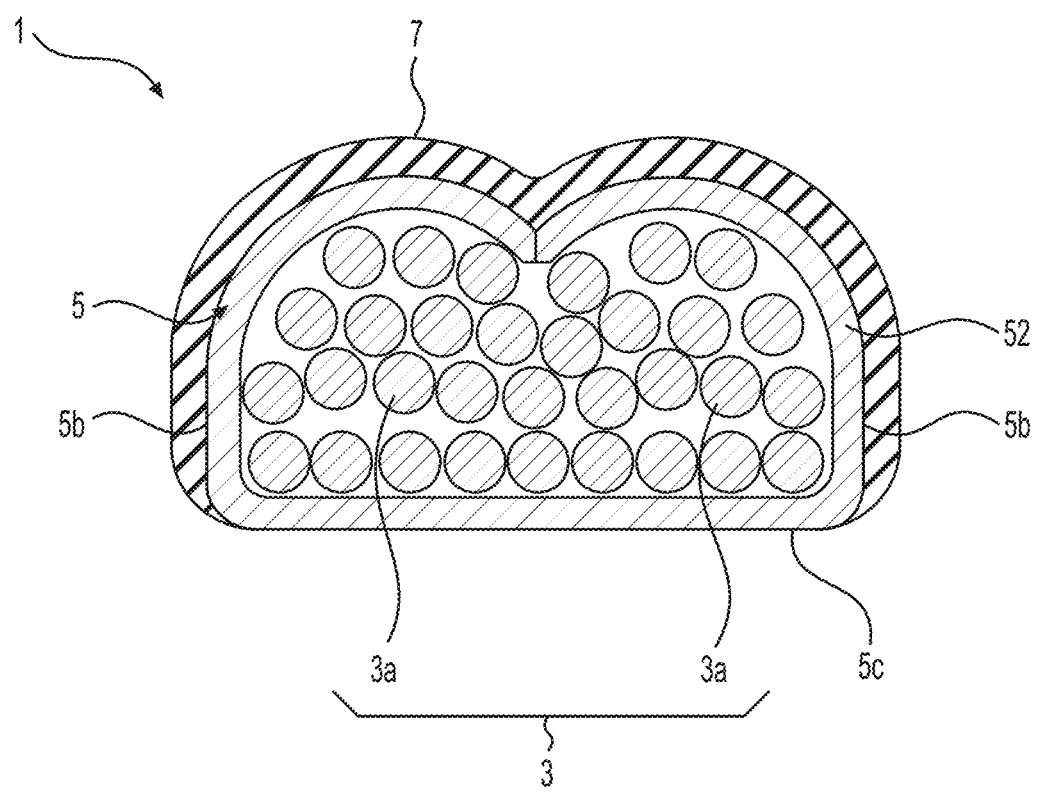
FIG. 2 is a longitudinal cross sectional view taken on line A-A in FIG. 1.

FIG. 1 is a perspective view of a terminal fitted electric wire according to a preferred embodiment of the present disclosure, and FIG. 2 is a vertical cross sectional view along line A-A in FIG. 1. As illustrated in FIG. 1 and FIG. 2, a terminal-fitted electric wire 1 contains a covered electric wire 2 which contains an electric wire conductor 3 and an insulation covering (i.e., insulator) 4. The covered electric wire 2 and a terminal 5 are electrically connected through an electric connection part 6.

The terminal 5 has a tab-shaped connection part 51 formed as an elongate flat plate to be connected with a mating terminal, and an electric wire fixing part 54 containing a wire barrel 52 and an insulation barrel 53 formed at the extended end of the connection part 51. The terminal 5 can be formed (or fabricated) to a predetermined shape by pressing of a plate material made of a metal.

In the electric connection part 6, the insulation covering 4 at the end of the covered electric wire 2 is stripped off to expose the electric wire conductor 3, and the exposed electric wire conductor 3 is press-bonded to one side of the terminal 5 to connect the covered electric wire 2 with the terminal 5. The wire barrel 52 of the terminal 5 is crimped over the electric wire conductor 3 of the covered electric wire 2 to electrically connect the electric wire conductor 3 with the terminal 5. Further, the insulation barrel 53 of the terminal 5 is crimped over the insulation covering 4 of the covered electric wire 2.

In the terminal-fitted electric wire 1, an area surrounded by a dotted chain in FIG. 1 is covered with a cured product 7 of the present protection composition. Specifically, an area from the surface part of the terminal 5 ahead of the front end of the electric wire conductor 3 exposed from the insulation covering 4 to the surface part of the insulation covering 4 behind the backward end of the electric wire conductor 3 exposed from the insulation covering 4 is covered with the cured product 7. That is, the covered electric wire 2 is covered with the cured product 7 such that on the distal end 2a of the wire 2, the cured product 7 slightly extends off toward the connection part 51 of the terminal 5 from the distal end of the electric wire conductor 3. The terminal 5 is covered with the cured product 7 such that on the distal end 5a of the terminal 5, the cured product 7 slightly extends off toward the insulation covering 4 of the covered electric wire 2 from the end part of the insulation barrel 53. As shown in FIG. 2, side surfaces 5b of the terminal 5 are also covered with the cured product 7. A back surface 5c of the terminal 5 may not be covered with the cured product 7 or may be covered with the cured product 7. The peripheral edge of the cured product 7 includes a part in contact with the surface of the terminal 5, a part in contact with the surface of the electric wire conductor 3, and a part in contact with the surface of the insulation covering 4.

In this way, the electric connection part 6 is covered with the cured product 7 at a predetermined thickness along the shape of the outer periphery of the terminal 5 and the covered electric wire 2. Thus, a part of the electric wire 2 where the electric wire conductor 3 is exposed from the insulation covering 4 is completely covered with the cured product 7 so as not to be exposed to the outside. Accordingly, the electric connection part 6 is completely covered with the cured product 7. Since the cured product 7 has excellent adhesion to all of the electric wire conductor 3, the insulation covering 4, and the terminal 5, the cured product 7 prevents intrusion of moisture from the outside to the electric wire conductor 3 and the electric connection part 6, which may cause corrosion of the metal parts. Further, since the cured product 7 is excellent in adhesion, a gap is less likely to be formed between the cured product 7 and any of the electric wire conductor 3, the insulation covering 4, and the terminal 5 at the peripheral end of the cured product 7 even when the electric wire is bent, for example, in the processes from the production of the wire harness to the attachment to a vehicle, thereby maintaining the waterproofness and anticorrosion function.

The present protection composition forming the cured product 7 covers the predetermined area. For the application of the present protection composition forming the cured product 7, known methods such as dripping, and coating can be used.

The cured product 7 is formed at a predetermined thickness in a predetermined area. The thickness is, preferably, 0.1 mm or lower. If the cured product 7 is excessively thick, it is difficult to insert the terminal 5 into a connector.

The electric wire conductor 3 of the covered electric wire 2 is a stranded wire composed of a plurality of elemental wires 3a. In this case, the stranded wire may be composed of a single type of metal elemental wires or two or more types of metal elemental wires. Further, the stranded wire may also contain organic fibers in addition to metal elemental wires. The stranded wire composed of a single type of metal elemental wires means that all metal wires forming the stranded wire are formed of the same metal material, while the stranded wire composed of two or more types of metal elemental wires means that the stranded wire contains metal elemental wires formed of different metal materials. The stranded wire may also include reinforcing wires (i.e., tension members) for reinforcing the covered electric wire 2.

Examples of the material of metal elemental wires forming the electric wire conductor 3 include copper, copper alloys, aluminum, aluminum alloys, and materials having various types of plated layers on the metals described above. The material of the metal wires as the reinforcing wires includes, for example, copper alloys, titanium, tungsten, and stainless steels. Further, the organic fibers as the reinforcing wires maybe, for example, KEVLAR. The metal elemental wires forming the electric wire conductor 3 are preferably made of aluminum, aluminum alloys or materials having various types of plated layers on the metals from a viewpoint of reducing the weight.

The material for the insulation covering 4 may be, for example, rubber, polyolefin, PVC, or a thermoplastic elastomer. They may be used alone or two or more of them may be used in combination. Various additives may be added as required to the material of the insulation covering 4. Examples of the additives include flame retardants, fillers, and colorants.

The material for the terminal 5 (i.e., material for a substrate) may be various copper alloys, copper, etc. in addition to generally used brass. The surface of the terminal 5 may be plated with various metals such as tin, nickel, and gold partially (for example, on an area including the contact surface) or entirely.

While a terminal is press-bonded to the end of the electric wire conductor in the terminal-fitted electric wire 1 illustrated in FIG. 1, other known electric connection methods such as welding may also be used instead of the press-bonding connection.

EXAMPLE

The embodiments of the present disclosure are to be described by way of examples but the present disclosure is not restricted to the examples.

Preparation of the Surface Protection Composition

Sample 1

Calcium hydroxide was added to a methanol solution of oleylacid phosphate, stirred at room temperature, and the methanol was distilled off. Next, isobornyl acrylate, an acylphosphine oxide photopolymerization initiator ("Omnirad TPO H" manufactured by IGM Resins B.V.), α-aminoacetophenone photopolymerization initiator ("Omnirad369" manufactured by IGM Resins B.V.), and a lubricating base oil (mineral base oil) were added to prepare a surface protection composition. The content ration (in mass %) is shown in Table 1.

* Oleyl acid phosphate: phosphorus compounds having hydrocarbon groups having 18 carbon atoms with a carboncaron double bond
* Isobornyl acrylate: acrylate having a cyclic hydrocarbon chain of 10 carbons Samples 2-18

Surface protection compositions were prepared in the same manner as Sample 1, with the content ratio (in mass %) shown in Table 1. Samples 9 and 11 did not contain the lubricating base oil. Sample 4 contained an amine compound instead of a metal-containing compound.

* 2-ethylhexylacid phosphate: a phosphorus compound with an 8-carbon hydrocarbon group with a branched structure.
* Octylamine: an 8-carbon aliphatic primary amine. * Nonanediol diacrylate: a diacrylate with a linear hydrocarbon chain of 9 carbons.
* Neopentyl glycol diacrylate: a diacrylate with a branched hydrocarbon chain of 5 carbons.
* Omnirad 819: an acylphosphine oxide photopolymerization initiator.
* Omnirad 907: an α-aminoacetophenone photopolymerization initiator.

Sample 21

The surface protection composition was prepared in the same manner as Sample 1, except that neither the compounds (a), (b-1), nor (b-2) was added.

Sample 22

The surface protection composition was prepared in the same manner as Sample 1, except that the compound (c) was not added.

Samples 23 and 25

The surface protection compositions were prepared in the same manner as Sample 1, except that the compound (d-2) was not added.

Samples 24 and 26

The surface protection compositions were prepared in the same manner as Sample 1, except that the compound (d-1) was not added.

Sample 27

The surface protection composition was prepared in the same way as Sample 1, except that the total amount of the compounds (d-1) and (d-2) was increased.

Evaluation

Measurement of the Thin Film Curing Rate

Onto a copperplate of 2 cm×2 cm, each of the above-prepared surface protection compositions was applied into the form of a thin film (film thickness of 4.6 μm) with a #2 bar coater, and then curing of the films was performed by irradiating the surface of the film with a UV lamp (100 mW/cm$^2$, manufactured by SEN LIGHTS Corporation) for 20 seconds. The total amount of the thin film was immediately scraped off with a polytetrafluoroethylene spatula and used as a sample for measuring the curing rate of the thin film. Using a Fourier transform infrared spectrophotometer (FT-IR), the infrared spectrum (4000 to 400 cm$^{-1}$) of the sample for measurement was measured, and the infrared absorption peak area Aa at 811 cm$^{-1}$ based on the unsaturated double bond of acrylate in the sample for measurement and the infrared absorption peak area Ab at 1735 cm$^{-1}$ based on the ester bond of acrylate were calculated respectively to obtain the ratio Aa/Ab. The ratio $Aa_0$/Ab measured for the same composition with 0% cure (not cured) and the ratio $Aa_{100}$/Ab measured for the same composition with 100% cure (fully cured) were used as standards to determine the curing rate of the thin film. In the fully cured sample, the infrared absorption peak at 811 cm$^{-1}$ based on the unsaturated double bond of acrylate has disappeared, and $Aa_{100}$/Ab=0. If the curing rate of the thin film is 90% or higher by this measurement method, the thin-film curability is high.

Anticorrosion Current

A strip-shaped copper plate of 1 cm×5 cm was prepared, and a region of the plate of 2 cm from one edge was immersed into each prepared surface protection composition at room temperature. After the strip-shaped copper plates were taken out, each of them was prepared to a thin film (thickness of 4.6 μm) with a #2 bar coater, and then curing of the thin films was performed by irradiating the surface of the thin film with a UV lamp (100 mW/cm$^2$, manufactured by SEN LIGHTS Corporation) for 30 seconds to provide a test piece for measurement. The region of the test piece covered with a coating film was used as a cathode electrode, and an aluminum plate separately prepared was used as an anode electrode. Both electrodes were immersed into an aqueous solution of 5% sodium chloride, and a potential difference between the electrodes (i.e., corrosion current) were measured. A smaller potential difference indicates that the thin film is formed more uniformly on the strip-shaped copper plate and exhibits stronger adsorption force to the surface of the strip-shaped copper plate. On the other hand, a larger potential difference indicates that the thin film is formed less uniformly on the copper plate or exhibits weaker adsorption force to the surface of the strip-shaped copper plate. Further, when the untreated strip-shaped copper plate without being immersed into the surface protection composition was used as the cathode electrode, the corrosion current was 80 μA. If the current measured with the test piece treated with the surface protection composition is smaller than ⅕ of the above-mentioned current value of 80 μA, the surface protection performance (corrosion inhibition performance) can be judged to be highly effective.

Precipitation

Each prepared surface protection composition was left at room or left in cold storage for 2 weeks, and then precipitation of the components of the surface protection composition was examined visually. If no precipitation of components under either room or lower temperature was shown, the prepared composition was evaluated as "A". If the precipitation of components under either room temperature or cold storage was shown, the prepared composition was evaluated as "C".

TABLE 1

|   |   | Samples |   |   |   |   |   |   |   |   |
|---|---|---|---|---|---|---|---|---|---|---|
|   |   | 1 | 2 | 3 | 4 | 5 | 6 | 7 | 8 | 9 |
| (a) | (a-1) | 27.0 | — | — | — | — | — | — | — | — |
|   | (a-2) | — | 24.0 | 24.0 | 21.0 | 24.0 | 24.0 | 24.0 | 24.0 | 83.0 |
| (b-1) | (b-1-1) | 3.0 | 6.0 | — | — | — | — | 6.0 | 6.0 | 8.0 |
|   | (b-1-2) | — | — | 6.0 | — | — | — | — | — | — |
|   | (b-1-3) | — | — | — | — | 6.0 | — | — | — | — |
|   | (b-1-4) | — | — | — | — | — | 6.0 | — | — | — |
| (b-2) | (b-2-1) | — | — | — | 9.0 | — | — | — | — | — |
| (c) | (c-1) | 17.0 | 17.0 | 17.0 | 17.0 | 17.0 | 17.0 | — | — | 6.0 |
|   | (c-2) | — | — | — | — | — | — | 17.0 | — | — |
|   | (c-3) | — | — | — | — | — | — | — | 17.0 | — |
| (d-1) | (d-1-1) | 1.5 | 1.5 | 1.5 | 1.5 | 1.5 | 1.5 | 1.5 | 1.5 | 1.5 |
|   | (d-1-2) | — | — | — | — | — | — | — | — | — |
| (d-2) | (d-2-1) | 1.5 | 1.5 | 1.5 | 1.5 | 1.5 | 1.5 | 1.5 | 1.5 | 1.5 |
|   | (d-2-2) | — | — | — | — | — | — | — | — | — |

TABLE 1-continued

|   |   | | | | | | | | | |
|---|---|---|---|---|---|---|---|---|---|---|
| (e) | (e-1) | 50.0 | 50.0 | 50.0 | 50.0 | 50.0 | 50.0 | 50.0 | 50.0 | — |
|  | Phosphorus content from the compound (a) (mass %) | 1.9 | 2.8 | 2.8 | 2.4 | 2.8 | 2.8 | 2.8 | 2.8 | 9.6 |
|  | Metal content from the compound (b) (mass %) | 1.6 | 3.2 | 3.5 | — | 1.0 | 3.1 | 3.2 | 3.24 | 4.3 |
|  | Nitrogen content from the compound (b) (mass %) | — | — | — | 1.0 | — | — | — | — | — |
| Evaluation | Curing rate of the thin film (%) | 86 | 77 | 85 | 89 | 81 | 84 | 90 | 85 | 68 |
|  | Corrosion current (μA) | 9.4 | 14.6 | 11.9 | 9.6 | 10.3 | 11.6 | 9.1 | 12.1 | 15.3 |
|  | Precipitation | A | A | A | A | A | A | A | A | A |

|   |   | Samples | | | | | | | | |
|---|---|---|---|---|---|---|---|---|---|---|
|   |   | 10 | 11 | 12 | 13 | 14 | 15 | 16 | 17 | 18 |
| (a) | (a-1) | — | — | — | — | — | — | — | — | — |
|  | (a-2) | 2.0 | 52.0 | 24.0 | 24.0 | 24.0 | 24.0 | 24.0 | 24.0 | 24.0 |
| (b-1) | (b-1-1) | 0.5 | 15.0 | 6.0 | 6.0 | 6.0 | 6.0 | 6.0 | 6.0 | 6.0 |
|  | (b-1-2) | — | — | — | — | — | — | — | — | — |
|  | (b-1-3) | — | — | — | — | — | — | — | — | — |
|  | (b-1-4) | — | — | — | — | — | — | — | — | — |
| (b-2) | (b-2-1) | — | — | — | — | — | — | — | — | — |
| (c) | (c-1) | 25.0 | 30.0 | 3.0 | 17.0 | 17.0 | 17.0 | 17.0 | 17.0 | 17.0 |
|  | (c-2) | — | — | — | — | — | — | — | — | — |
|  | (c-3) | — | — | — | — | — | — | — | — | — |
| (d-1) | (d-1-1) | 1.5 | 1.5 | 1.5 | 0.1 | 3.0 | — | — | 0.3 | — |
|  | (d-1-2) | — | — | — | — | — | 0.1 | 0.7 | — | 0.3 |
| (d-2) | (d-2-1) | 1.5 | 1.5 | 1.5 | 0.5 | 1.7 | 3.0 | 2.5 | — | — |
|  | (d-2-2) | — | — | — | — | — | — | — | 0.7 | 1.7 |
| (e) | (e-1) | 69.5 | — | 64.0 | 52.4 | 48.3 | 49.9 | 49.8 | 52.0 | 51.0 |
|  | Phosphorus content from the compound (a) (mass %) | 0.2 | 6.0 | 2.8 | 2.8 | 2.8 | 2.8 | 2.8 | 2.8 | 0.2 |
|  | Metal content from the compound (b) (mass %) | 0.3 | 8.1 | 3.2 | 3.2 | 3.2 | 3.2 | 3.2 | 3.2 | 0.3 |
|  | Nitrogen content from the compound (b) (mass %) | — | — | — | — | — | — | — | — | — |
| Evaluation | Curing rate of the thin film (%) | 72 | 78 | 82 | 88 | 85 | 83 | 92 | 86 | 89 |
|  | Corrosion current (μA) | 14.6 | 13.8 | 11.5 | 10.2 | 11.3 | 10.7 | 9.5 | 10.2 | 9.3 |
|  | Precipitation | A | A | A | A | A | A | A | A | A |

(a-1) Oleylacid phosphate
(a-2) 2-Ethylhexylacid phosphate
(b-1-1) Calcium hydroxide
(b-1-2) Basic zinc carbonate
(b-1-3) Lithium hydroxide monohydrate
(b-1-4) Aluminium hydroxide
(b-2-1) Octylamine
(c-1) Isobornyl acrylate
(c-2) Nonandiol diacrylate
(c-3) Neopentyl glycol diacrylate
(d-1-1) Omnirad TPO
(d-1-2) Omnirad 819
(d-2-1) Omnirad 369
(d-2-2) Omnirad 907
(e-1) Paraffinum base oil: dynamic viscosity = 11.1 mm$^2$/s (100° C.)

TABLE 2

|   |   | Samples | | | | | | |
|---|---|---|---|---|---|---|---|---|
|   |   | 21 | 22 | 23 | 24 | 25 | 26 | 27 |
| (a) | (a-1) | — | — | — | — | — | — | — |
|  | (a-2) | — | 24.0 | 24.0 | 24.0 | 24.0 | 24.0 | 24.0 |
| (b-1) | (b-1-1) | — | 6.0 | 6.0 | 6.0 | 6.0 | 6.0 | 6.0 |
|  | (b-1-2) | — | — | — | — | — | — | — |
|  | (b-1-3) | — | — | — | — | — | — | — |
|  | (b-1-4) | — | — | — | — | — | — | — |
| (b-2) | (b-2-1) | — | — | — | — | — | — | — |
| (c) | (c-1) | 60.0 | — | 17.0 | 17.0 | 17.0 | 17.0 | 17.0 |
|  | (c-2) | — | — | — | — | — | — | — |
|  | (c-3) | — | — | — | — | — | — | — |
| (d-1) | (d-1-1) | 1.5 | 1.5 | 3.0 | — | 1.0 | — | 1.0 |
|  | (d-1-2) | — | — | — | — | 2.0 | — | — |
| (d-2) | (d-2-1) | 1.5 | 1.5 | — | 3.0 | — | 1.5 | 4.0 |
|  | (d-2-2) | — | — | — | — | — | 1.5 | — |

TABLE 2-continued

|   |   | Samples | | | | | | |
|---|---|---|---|---|---|---|---|---|
|   |   | 21 | 22 | 23 | 24 | 25 | 26 | 27 |
| (e) | (e-1) | 37.0 | 67.0 | 50.0 | 50.0 | 50.0 | 50.0 | 48.0 |
|  | Phosphorus content from the compound (a) (mass %) | 0.0 | 2.8 | 2.8 | 2.8 | 2.8 | 2.8 | 2.8 |
|  | Metal content from the compound (b) (mass %) | 0.0 | 3.2 | 3.2 | 3.2 | 3.2 | 3.2 | 3.2 |
|  | Nitrogen content from the compound (b) (mass %) | — | — | — | — | — | — | — |
| Evaluation | Curing rate of the thin film (%) | 58 | — | 25 | 43 | 58 | 49 | 83 |
|  | Corrosion current (μA) | 42.9 | 22.7 | 39.2 | 23.7 | 19.1 | 20.2 | 11 |
|  | Precipitation | A | A | A | A | A | A | C |

(a-1) Oleylacid phosphate
(a-2) 2-Ethylhexylacid phosphate
(b-1-1) Calcium hydroxide
(b-1-2) Basic zinc carbonate
(b-1-3) Lithium hydroxide monohydrate
(b-1-4) Aluminium hydroxide
(b-2-1) Octylamine
(c-1) Isobornyl acrylate
(c-2) Nonandiol diacrylate
(c-3) Neopentyl glycol diacrylate
(d-1-1) Omnirad TPO
(d-1-2) Omnirad 819
(d-2-1) Omnirad 369
(d-2-2) Omnirad 907
(e-1) Paraffinum base oil: dynamic viscosity = 11.1 mm²/s (100° C.)

The surface protection compositions of samples 1-18 each contained the compound (a), the compounds (b-1) or (b-2), the compounds (c), (d-1), and (d-2). As a result, the present protection composition had excellent anticorrosion to prevent corrosion of the metal, and also excellent thin-film curability. Furthermore, samples 1-18 contained the compounds (d-1) and (d-2) at the specific rate. Thus, the precipitation of the compounds (d-1) and (d-2) was inhibited.

The surface protection composition of sample 21 neither contained the compounds (a), (b-1), nor (b-2). Thus, although the sample became the cured product after UV irritating, the sample did not absorb on the metal surface, showed high corrosion current, and showed insufficient anticorrosion to prevent the metal corrosion. The surface protection composition of sample 22 did not contain the compound (c), thus sample 22 was not cured after UV irritating, showed high corrosion current, and showed insufficient anticorrosion performance to prevent metal corrosion. The surface protection composition of samples 23, 24, 25, and 26 did not contain the compound (d-1) or the compound (d-2). These samples showed insufficient result of thin film curability. Moreover, these samples showed high corrosion current and insufficient anticorrosion performance to prevent the metal surface since these samples had insufficient curability. Sample 27 had a large total amount of the compounds (d-1) and (d-2). Therefore, the precipitation of the compounds (d-1) and (d-2) was not suppressed.

The embodiments of the present disclosure have been described specifically but the present disclosure is no way restricted to the embodiment described above but can be modified variously within a range not departing from the gist of the present disclosure.

DESCRIPTION OF REFERENCE NUMERALS

1 Terminal fitted electric wire
2 Covered electric wire
2a Distal end
3 Electric wire conductor
3a Elemental wire
4 Insulation covering (insulator)
5 Terminal
5a Tip of terminal
5b Side surface of terminal
5c Back side of terminal
51 Connection part
52 Wire barrel
53 Insulation barrel
54 Electric wire fixing part
6 Electric connection part
7 Cured product

The invention claimed is:
1. A surface protection composition comprising:
(a) a phosphorus compound represented by the following general formula (1),

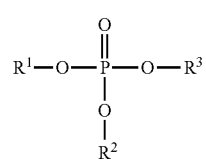

where $R^1$ represents a hydrogen atom, $R^2$ represents a hydrocarbon group having 4 to 30 carbon atoms, and $R^3$ represents a hydrogen atom or a hydrocarbon group having 4 to 30 carbon atoms;
(b-1) a metal-containing compound or (b-2) an amine compound;
(c) a (meth)acrylate having a hydrocarbon chain having 4 or more carbon atoms;
(d-1) an acylphosphine oxide photopolymerization initiator; and
(d-2) an α-aminoacetophenone photopolymerization initiator, wherein the surface protection composition comprises the compound (d-1) in an amount of 0.1 to 3.0 mass % with respect to the total amount of the composition;

the compound (d-2) in an amount of 0.1 to 3.0 mass % with respect to the total amount of the composition; and wherein the total amount of the compounds (d-1) and (d-2) is less than 5.0 mass % with respect to the total amount of the composition.

2. The surface protection composition according to claim 1, wherein the surface protection composition comprises the compound (a) in an amount of 0.1 to 10 mass % in terms of phosphorus element with respect to the total amount of the composition;

the compound (b-1) in an amount of 0.1 to 10 mass % in terms of a metal element with respect to the total amount of the composition or the compound (b-2) in an amount of 0.1 to 5.0 mass % in terms of a nitrogen element with respect to the total amount of the composition; and the compound (c) in an amount of 1.0 to 70 mass % with respect to the total amount of the composition.

3. The surface protection composition according to claim 2, wherein the compound (c) has two or more carbon-carbon double bounds.

4. The surface protection composition according to claim 3, wherein the compound (b-1) is at least one selected from the group consisting of alkali metals, alkaline earth metals, aluminum, titanium, and zinc.

5. The surface protection composition according to claim 4, wherein at least one of the hydrocarbon groups having 4 to 30 carbon atoms in the compound (a) has one or more branched structures or one or more carbon-carbon double bonds.

6. The surface protection composition according to claim 5, further wherein the surface protection composition further contains (e) a lubricating base oil in an amount of 10 to 90 mass % with respect to the total amount of the composition.

7. A terminal-fitted electric wire comprising:
a terminal fitting;
an electric wire; and
an electric connection part between the terminal fitting and the electric conductor, covered with a cured product of the surface protection composition according to claim 6.

8. The surface protection composition according to claim 1, wherein the compound (c) has two or more carbon-carbon double bounds.

9. The surface protection composition according to claim 1, wherein the compound (b-1) is at least one selected from the group consisting of alkali metals, alkaline earth metals, aluminum, titanium, and zinc.

10. The surface protection composition according to claim 1, wherein at least one of the hydrocarbon groups having 4 to 30 carbon atoms in the compound (a) has one or more branched structures or one or more carbon-carbon double bonds.

11. The surface protection composition according to claim 1, further wherein the surface protection composition further contains (e) a lubricating base oil in an amount of 10 to 90 mass % with respect to the total amount of the composition.

12. A terminal-fitted electric wire comprising:
a terminal fitting;
an electric wire; and
an electric connection part between the terminal fitting and the electric conductor, covered with a cured product of the surface protection composition according to claim 1.

13. The surface protection composition according to claim 1, which can be applied by coating at room temperature.

* * * * *